May 5, 1936.  N. B. STONE  2,039,855

CHUCK

Filed May 6, 1935

Inventor
N. B. Stone
By
A. D. Adams
Attorney

Patented May 5, 1936

2,039,855

UNITED STATES PATENT OFFICE 2,039,855

CHUCK

Nathaniel B. Stone, Washington, D. C.

Application May 6, 1935, Serial No. 20,105

3 Claims. (Cl. 279—79)

This invention relates to tool holders, more particularly, to an improved chuck for various types of tools, such as drills, etc., and among other objects, aims to provide a greatly simplified, inexpensive, rugged and reliable chuck and drill shank having provision for releasably holding the tool in the chuck and for positively locking it therein under ordinary working strains. The main idea is to provide a chuck of the type which permits easy insertion of a tool shank, prevents binding of the shank therein and permits easy removal therefrom without the aid of any special tools for such purposes.

Other aims and advantages of the invention will appear in the specification, when considered in connection with the accompanying drawing, wherein.

Figure 1:
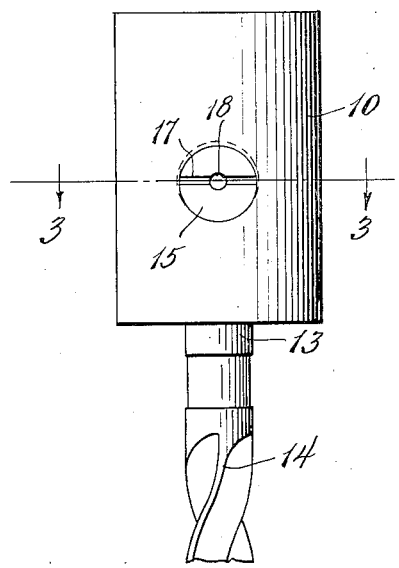
Fig. 1 is a side elevation of a chuck and drill embodying the invention.
Figure 2:
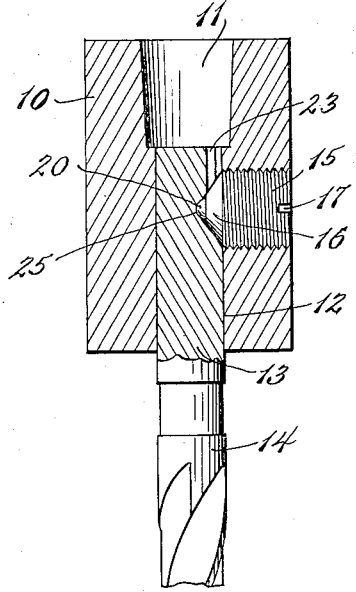
Fig. 2 is a longitudinal sectional view of the chuck.

Referring particularly to the drawing, the type of chuck there shown is designed for use with tools having standard cylindrical shanks. In this example, the chuck body 10 is conveniently made cylindrical and has a tapered socket 11 for receiving the shaft of a drill press or the like (not shown). The lower portion of the chuck has a cylindrical socket 12 of such size as to receive the shank 13 of a tool or drill 14 which fits closely therein.

Figure 3:
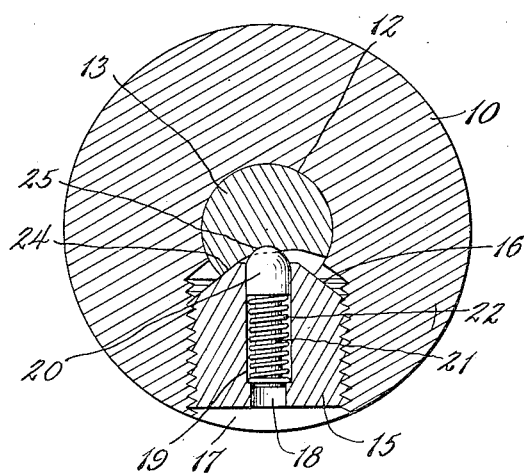
Fig. 3 is a section taken on the line 3—3 of Fig. 1.

To hold the shank in the chuck and prevent it from turning, there is shown a radial plug 15 in the chuck presenting a tapered or rounded inner end 16 projecting into the tool socket near its upper end. This plug is screw threaded to make it easily removable or adjustable and is shown as having a screw driver slot 17 for this purpose. Referring to Fig. 3, it is shown as having an axial bore 18 and a counterbore 19 to receive a tool retaining member, conveniently in the form of a plunger 20 having a stem 21 and normally urged inwardly by a coil spring 22, the inner end of the plunger being rounded, as clearly shown. The outermost convolution of the coil spring is larger in diameter than the other convolutions so that it frictionally engages the bottom portion of the counterbore to hold it in place. Also, the outer end of the stem 21 is preferably peened or battered after the spring has been put on so as to limit the inward movement of the plunger. Otherwise, the plunger would be forced too far into the tool socket 12 and would be in the way of a shank when it is inserted. It is to be understood that other types of spring urged ball members may be employed.

Figure 4:
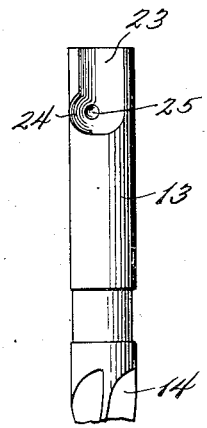
Fig. 4 is a view of a slotted drill shank adapted for use in the chuck.
Figure 5:
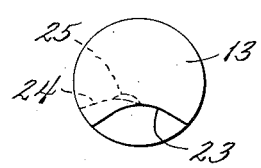
Fig. 5 is an end view of the shank.

The plug is designed to cooperate with the shank of the drill, which is shown as being provided with a specially shaped slot best shown in Fig. 4. In this instance, the slot comprises a longitudinal and rounded groove 23 extending through the end of the shank and terminating in an offset rounded groove 24, in the central portion of which is a depression 25, adapted to provide a seat for the rounded nose of the plunger 20. The offset portion of the slot is somewhat similar to an ordinary bayonet slot except that it is shallower. The offset is on the left side of the main slot, as viewed in Fig. 4, so that the shank of the tool is locked automatically in the chuck when turning torque is applied to the tool as it is rotated to the right. In fact, the tool automatically locks itself in place when its shank is pushed home in the chuck, the rounded nose of the plunger being guided longitudinally in the groove 23 and slightly laterally to its seat 25. It will be observed that the seat is slightly offset from the axis of the slot 23. Thus, the curved end wall of the offset portion 24 provides a shoulder which coacts with the tapered inner end 16 of the plug to prevent the tool from dropping out or being pulled out except by overcoming the spring pressure of the ball and turning the tool slightly to the left. It will also be observed that the depth of the longitudinal groove 23 is only slightly less than the normal inward projection of the plunger so that the plunger exerts slight spring pressure against the bottom of this groove as the tool shank is inserted in the chuck. The rounded nose of the plunger permits the groove portion of the shank to push the plunger outwardly as the upper end of the shank passes it. Thus, the plunger holds the tool by friction until its shank is pushed home.

Referring to Fig. 3, which shows the position of the tool shank when it is locked in the chuck, it will be noted that the end wall of the offset slot or groove 24 engages the tapered end wall 16 of the plug. Thus, all of the working thrust is transmitted through the plug and practically no lateral thrust is imparted to the plunger. The shape of the end wall of the slot 24 preferably conforms to the shape of the inner tapered end 16 so that it has surface contact therewith to avoid making a burr on the plug. However, the tapered end is preferably case hardened to prevent it from being burred.

If the tool is designed to be rotated to the left instead of to the right, the plunger may be screwed in a little farther positively to lock the shank in the chuck so that the tapered end 16 engages the bottom of the offset groove portion 24. In that case, the shank may be disengaged by backing out or unscrewing the plunger with an ordinary screw driver or special tool used for this purpose.

From the foregoing description, it will be seen that the chuck is very simple and rugged in construction. It is designed to cooperate with tools having standard shanks provided with special slots which can be made very easily at a relatively small cost. There are no parts subject to destructive wear and require quick replacement.

Obviously, the present invention is not restricted to the particular embodiment thereof herein shown and described.

What is claimed is:

1. A tool holder of the character described comprising, in combination, a chuck having a cylindrical socket; a plug having a tapered end projecting into the socket; a spring pressed member in the plug; a tool shank fitted in the socket having a slot adapted to engage the tapered end of said plug and extending through the end of the shank; and said slot having a depression in its lower end portion providing a seat for said spring urged member, whereby the spring urged member releasably holds the tool in the socket.

2. A tool chuck of the character described comprising a substantially cylindrical body portion having a shaft socket at one end and a tool socket in the other end; a tool shank having a longitudinal slot in the upper end; an adjustable screw threaded plug extending radially through the body and having a tapered inner end in the tool socket to engage said slot; and a spring urged member having a rounded nose in said plug adapted to engage the bottom of said slot and frictionally hold the tool in said socket.

3. A tool holder of the character described comprising, in combination, a chuck having a cylindrical tool socket; a screw threaded plug extending radially through the body of the chuck and having a tapered inner end; a spring urged member having a rounded nose arranged axially in the plug; a tool shank having an elongated slot extending through its upper end and offset laterally at its lower end, said offset portion presenting a wall to engage said tapered end of the plug; and the offset portion also having a depressed seat in its central portion for the rounded nose of said spring urged member, whereby the tool shank is locked automatically in the chuck when it is pushed home therein and will remain locked as long as turning thrust is applied to the tool.

NATHANIEL B. STONE.